United States Patent
Sandru et al.

(10) Patent No.: US 12,201,937 B2
(45) Date of Patent: Jan. 21, 2025

(54) HYBRID POLYMER MEMBRANE

(71) Applicant: SINTEF TTO AS, Trondheim (NO)

(72) Inventors: Marius Sandru, Trondheim (NO); Eugenia Mariana Sandru, Trondheim (NO); Per Martin Stenstad, Trondheim (NO)

(73) Assignee: SINTEF TTO AS, Trondheim (NO)

( * ) Notice: Subject to any disclaimer, the term of this patent is extended or adjusted under 35 U.S.C. 154(b) by 1014 days.

(21) Appl. No.: 17/051,704

(22) PCT Filed: Apr. 30, 2019

(86) PCT No.: PCT/NO2019/050097
§ 371 (c)(1),
(2) Date: Oct. 29, 2020

(87) PCT Pub. No.: WO2019/212359
PCT Pub. Date: Nov. 7, 2019

(65) Prior Publication Data
US 2021/0229031 A1    Jul. 29, 2021

(30) Foreign Application Priority Data
Apr. 30, 2018 (NO) .................................. 20180621

(51) Int. Cl.
*B01D 53/22* (2006.01)
*B01D 53/62* (2006.01)
(Continued)

(52) U.S. Cl.
CPC ........... *B01D 53/228* (2013.01); *B01D 53/62* (2013.01); *B01D 53/85* (2013.01);
(Continued)

(58) Field of Classification Search
CPC ............... B01D 67/0006; B01D 71/82; B01D 2323/385; B01D 71/38; B01D 69/06;
(Continued)

(56) References Cited

U.S. PATENT DOCUMENTS 3,925,157 A    12/1975  Hamsher
4,338,401 A *   7/1982  Cremonesi ............. C12N 11/12
                                                       435/178
(Continued)

FOREIGN PATENT DOCUMENTS

CN    102170955    8/2011
CN    103041718    4/2013
(Continued)

OTHER PUBLICATIONS

Machine Translation WO20140157012, 15 pages, Asano Oct. 2, 2014 (Year: 2014).*
(Continued)

*Primary Examiner* — Anthony R Shumate
(74) *Attorney, Agent, or Firm* — Wissing Miller LLP

(57) ABSTRACT

The present invention relates to $CO_2$ capture from gas mixtures by use of gas separation membranes. In particular, the invention relates to a gas separation membrane comprising: a gas permeable or porous support layer; and at least one $CO_2$ selective polymer layer comprising carbonic anhydrase (CA) enzymes fixed within the at least one $CO_2$ selective polymer layer. The present invention also relates to the method of separating $CO_2$ from a gas and to the use of the gas separation membrane.

9 Claims, 4 Drawing Sheets

(51) Int. Cl.
*B01D 53/85* (2006.01)
*B01D 67/00* (2006.01)
*B01D 69/02* (2006.01)
*B01D 69/06* (2006.01)
*B01D 69/12* (2006.01)
*B01D 69/14* (2006.01)
*B01D 71/38* (2006.01)
*B01D 71/40* (2006.01)
*B01D 71/82* (2006.01)
*C02F 3/34* (2023.01)
*C02F 101/10* (2006.01)
*C02F 103/20* (2006.01)

(52) U.S. Cl.
CPC ..... *B01D 67/0006* (2013.01); *B01D 67/0088* (2013.01); *B01D 67/0093* (2013.01); *B01D 69/02* (2013.01); *B01D 69/06* (2013.01); *B01D 69/12* (2013.01); *B01D 69/125* (2013.01); *B01D 69/144* (2013.01); *B01D 71/381* (2022.08); *B01D 71/40* (2013.01); *B01D 71/82* (2013.01); *C02F 3/342* (2013.01); *B01D 2257/504* (2013.01); *B01D 2258/0283* (2013.01); *B01D 2258/05* (2013.01); *B01D 2258/06* (2013.01); *B01D 2323/345* (2013.01); *B01D 2323/385* (2013.01); *B01D 2325/36* (2013.01); *C02F 2101/10* (2013.01); *C02F 2103/20* (2013.01)

(58) Field of Classification Search
CPC .. B01D 71/40; B01D 2257/504; B01D 53/85; B01D 2325/36; B01D 2323/345; B01D 53/228; B01D 69/144; B01D 69/125; B01D 53/62; B01D 67/0093; B01D 2258/0283; B01D 69/02; B01D 2258/06; B01D 2258/05; B01D 67/0088; C02F 3/342; C02F 2103/20; C02F 2101/10
See application file for complete search history.

(56) References Cited

U.S. PATENT DOCUMENTS

| | | | | |
|---|---|---|---|---|
| 6,232,611 | B1* | 5/2001 | Suzuki | G21K 4/00 250/483.1 |
| 6,291,582 | B1 | 9/2001 | Dordick | |
| 6,315,968 | B1 | 11/2001 | Quinn | |
| 7,540,948 | B2* | 6/2009 | Collier | C12Q 1/58 204/415 |
| 2002/0011408 | A1* | 1/2002 | Lee | G01N 27/4162 204/414 |
| 2002/0074285 | A1* | 6/2002 | Parent | C02F 3/102 210/601 |
| 2007/0055205 | A1* | 3/2007 | Wright | A61F 15/004 424/447 |
| 2010/0086795 | A1* | 4/2010 | Hirai | G03B 42/02 428/480 |
| 2012/0040429 | A1* | 2/2012 | Federspiel | B01D 69/145 435/174 |
| 2013/0052720 | A1* | 2/2013 | Fradette | B01D 53/18 435/293.1 |
| 2014/0127518 | A1* | 5/2014 | Ishikawa | C08J 7/042 427/515 |
| 2015/0010453 | A1 | 1/2015 | Gellett | |
| 2015/0129493 | A1 | 5/2015 | Federspiel | |
| 2018/0170017 | A1* | 6/2018 | Ettridge | C23C 14/221 |
| 2021/0236987 | A1* | 8/2021 | Sandru | B01D 69/12 |
| 2022/0305757 | A1* | 9/2022 | Khizar | F25D 25/025 |

FOREIGN PATENT DOCUMENTS

| | | |
|---|---|---|
| CN | 107847837 | 3/2018 |
| EP | 2861272 | 8/2017 |
| JP | 57013274 | 3/1982 |
| JP | 8-229367 | 9/1996 |
| JP | 2007222098 | 9/2007 |
| JP | 6235479 | 9/2016 |
| TW | 201714663 | 5/2017 |
| WO | 2014073582 | 11/2013 |
| WO | 2014157012 | 3/2014 |
| WO | 20140073582 | 5/2014 |
| WO | 20140157012 | 10/2014 |

OTHER PUBLICATIONS

Ming Yan et al: "Fabrication of Single Carbonic Anhydrase Nanogel against Denaturation and Aggregation at High Temperature", Biomacromolecules, vol. 8, No. 2, Feb. 1, 2007 (Feb. 1, 2007), pp. 560-565, XP055270789 us ISSN: 1525-7797, DOI: 10.1021/bm060746a abstract right col.

Plate N A et al: "The effect of the method of fixation of proteolytic enzymes in polymeric hydrogels on the blood-compatibility of modified polymers", Polymer Science U.S.S.R, Pergamon Press, Oxford, vol. 22, No. 9, Jan. 1, 1980 (Jan. 1, 1980), pp. 2150-2161, XP024126698, ISSN: 0032-3950, DOI: 10.1016/0032-3950(80)90078-7 [retrieved on Jan. 1, 1980].

International Search Report and Written Opinion mailed in PCT/NO2019/050097 on Nov. 8, 2019 (4 pages).

Search Report mailed in NO 20180621 on Nov. 29, 2018 (3 pages).

Peter J. et al.,"Multilayer composite membranes for gas separation based on crosslinked PTMSP gutter layer and partially crosslinked Matrimid® 5218 selective layer, Journal of Membrane Science, vol. 340, Issues 1-2,2009, pp. 62-72,ISSN 0376-7388; ISSN 0376-7388, layer".

Search Report and Written Opinion mailed in CN 20198003677.3 on Mar. 31, 2022.

Ezymology by Chen Shigen, Zhou Runqi Fudan University Press, pp. 142-143 (2001).

* cited by examiner

HYBRID POLYMER MEMBRANE

CROSS-REFERENCE TO RELATED APPLICATIONS

This application is a 371 of PCT/NO2019/050097 filed on Apr. 30, 2019, published on Nov. 7, 2019 under publication number WO 2019/212359, which claims priority benefits from Norwegian Patent Application No. 20180621 filed Apr. 30, 2018, the disclosure of each is incorporated herein in their entirety by reference.

TECHNICAL FIELD

The present invention relates to $CO_2$ capture from gas mixtures by use of gas separation membranes. In particular, the invention relates to $CO_2$ selective polymeric membranes and also the method of separating $CO_2$ from a gas mixture. The invention is also directed to the use of the $CO_2$ selective polymeric membranes.

BACKGROUND/PRIOR ART

Existent technologies for $CO_2$ capture from flue gas streams, such as conventional absorption or adsorption, have a high energy consumption and overall costs and represent a major obstacle for industrial implementation in the following major markets (by amount of $CO_2$ emitted): energy sector (flue gas from power plants), oil and gas (natural gas sweetening), industry (flue gas from cement, steelmaking). In addition, the chemicals used in amine absorption represent an extra pollution source to the environment.

Membrane technology for gas separation has become widely used. While polymeric membranes are economical and technologically useful, they are limited by their performance. The balance between permeability and selectivity affects the use of polymeric membranes for $CO_2$ separation from flue gas streams, and $CO_2$ separation becomes very expensive due to low permeability, which will require an extremely big membrane area leading to high investments costs.

Polymeric membranes concentrate the $CO_2$ from a large and dilute stream (5-20% $CO_2$) into a small and concentrated permeate stream (60-95% $CO_2$) due to higher $CO_2$ solubility and/or diffusion coefficient (solution-diffusion mechanism) compared to other gases such as $N_2$ and $O_2$ (flue gas, breathing), $CH_4$ (natural gas, biogas), or $H_2$ (syngas). The $CO_2$ selectivity versus the other gases ($N_2$, $O_2$, $CH_4$, $H_2$ or other gases) and $CO_2$ permeability is given by intrinsic properties of the membrane material. The driving force for the transport of gas molecules through a membrane is due to a partial pressure or concentration difference between feed and permeate side created by using a sweep gas or vacuum on the permeate side of the membrane.

One option for membrane separation is the use of a facilitated transport membrane. The most known membrane type using facilitated transport is supported liquid membrane (SLM) with mobile facilitated transport carriers. These have been studied for over two decades and are known to have both high gas permeability and high gas selectivity. However, for the SLM membranes serious degradation problems, such as evaporation of solution and deactivation of the carrier have restricted their further development and application.

Another alternative is using membranes where the facilitated transport carriers are fixed within a polymer matrix; i.e. fixed site carrier (FSC) membranes. Low $CO_2$ concentrations and the presence of water vapours (flue gas, natural gas, breathing, fermentation, etc.) favour the use of such fixed site carrier (FSC) membranes. They represent a generic class of membranes where the $CO_2$ is transported not only by the solution-diffusion mechanism but also by a reversible chemical reaction with a $CO_2$ carrier present in membranes (amine, ether, nanoparticles or other $CO_2$-philic groups/entities). The reversible chemical reaction with the $CO_2$ carriers compensates for the low $CO_2$ partial pressure difference over the membrane and increases the driving force.

U.S. Pat. No. 8,764,881 B2 discloses such a fixed site membrane suitable for separating a gas from a gas mixture comprising a non-crosslinked PVAm having a molecular weight of at least Mw 100,000 carried on a support wherein after casting onto the support, said PVAm has been heated to a temperature in the range 50 to 150° C.

Gas separation membranes still have a need for improved separation performance in order to be cost effective for industrial applications especially at low $CO_2$ concentrations in a mixture, below 20%, (preferably below 10% or 5% or 1%). These low $CO_2$ concentrations are very difficult to separate due to the lack of driving force.

SHORT SUMMARY OF THE INVENTION

The present invention provides a gas separation membrane comprising: a gas permeable or porous support layer; and at least one CO2 selective polymer layer comprising carbonic anhydrase (CA) enzymes fixed within the at least one CO2 selective polymer layer.

The carbonic anhydrase (CA) enzymes may also be fixed to a surface of the at least one CO2 selective polymer layer.

In one embodiment, the selective polymer layer comprises a mixture of amine groups and CA enzymes.

In one embodiment, the CA enzymes are thermostable enzymes, preferably resistant to temperatures of at least 50° C.

The CA enzymes are fixed within the polymer layer and optionally also to a surface of the polymer layer by using different procedures.

In one embodiment, the CA enzymes are first chemically modified with e.g. vinyl groups, and then copolymerized together with monomers to form a biopolymer, where CA enzymes are integrated along the polymer chain.

In another embodiment, CA enzymes may be immobilized to already existing polymer chains in bulk. Another embodiment includes immobilizing the chemically modified CA enzymes on the membrane surface. One embodiment of the invention combines the different procedures of immobilizing the enzymes.

The $CO_2$ selective polymer layer may be made of a hydrophilic polymer. Examples of hydrophilic polymers are polyvinyl alcohol, polyacrylamide, polyvinyl amide, polyvinyl amine and natural polymers such as alginate and chitosan.

Alternatively, the $CO_2$ selective polymer layer may be made of a water vapour permeable polymer. Examples of water vapour permeable polymer are polydimethylsiloxane (PDMS), poly[1-(trimethylsilyl)-1-propyne] (PTMSP) or perfluoro polymers such as poly[4,5-difluoro-2,2-bis(trifluoromethyl)-1,3-dioxole-co-tetrafluoroethylene].

The $CO_2$ selective polymer layer may have a thickness in the range from 0.1 to 10 µm, preferably from 0.1 to 5 µm.

The gas separation membrane comprises a support layer providing mechanical strength to the membrane. This layer may be porous or dense. Commercial porous support layers for water filter membranes are suitable. They may be made of materials such as polysulfone (PSF), polyethersulfone (PES) polyamide (PA), polyimide (PI), polyvinyl difluoride (PVDF), polyacrylonitrile (PAN) or cellulose acetate (CA). The thickness of this support layer may vary from 10 to 250 µm. Preferably, the pore size of the porous layer is from 0.0001 µm to 1 µm.

A dense layer made of gas permeable polymers having high gas permeability can also be used as mechanical support under the $CO_2$ selective layer. This layer can be supported as well on an additional porous layer underneath, and is then called a gutter layer. The thickness of such a dense layer may vary, from about 1 µm (when additional porous support is used) up to around 200 µm (without porous support). Examples of suitable high gas permeable polymers are polydimethylsiloxane (PDMS), poly(1-trimethylsilyl-1-propyne) (PTMSP), polymethylpentene (PMP) or amorphous fluoropolymers such as 4,5-difluoro-2,2-bis(trifluoromethyl)-1,3-dioxole-co-tetrafluoroethylene.

The gas separation membrane of the invention may further comprise a protective layer made of high gas and water vapour permeability material coated on top of the $CO_2$ selective polymer layer. Suitable materials for the protective layer are polydimethylsiloxane (PDMS), poly(1-trimethylsilyl-1-propyne) (PTMSP), polymethylpentene (PMP) or amorphous fluoropolymers such as poly [4,5-difluoro-2,2-bis(trifluoromethyl)-1,3-dioxole-co-tetrafluoroethylene].

The $CO_2$ selective polymer layer may have a single or a multilayer structure. In one embodiment, the multilayer structure comprises at least two layers selected from enzyme surface modified polymer layers and amine containing layers.

The present gas separation membrane is suitable for separation of $CO_2$ from gas mixtures such as flue gas, natural gas, biogas, air, fermentation processes and anaesthetic gases. Another application is use of the gas separation membrane in a membrane contactor for separating $CO_2$ from blood, or water in aquaculture and pisciculture or other industrial applications requiring liquids degassing.

The present invention also relates to a method of separating $CO_2$ from a gas mixture. The gas mixture is contacted with the gas separation membrane according to the invention, and at least part of the gas flow moves across the membrane. $CO_2$ molecules are transported selectively from the feed side to membrane permeate side by CA enzyme reaction and solution diffusion. $CO_2$ molecules are continuously removed from the permeate side by using a sweep gas or vacuum to maintain the partial pressure difference between the feed side and the permeate side.

FIGURES

DETAILED DESCRIPTION OF THE INVENTION

Figure 1:
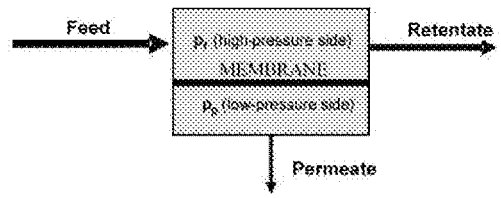
FIG. 1 shows a schematic view of gas separation by use of membrane.
Figure 2:
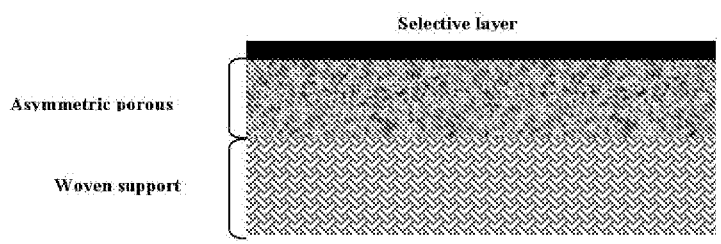
FIG. 2 shows a cross sectional view of a gas separation membrane.

FIG. 1 shows a simplified schematic design of a membrane gas separation process. The incoming feed stream 1, is passed over a membrane 2 and separated into two components: permeate 3 and retentate 4. The feed gas travels along the membrane and parts of the feed gas travel across the membrane 2 from the high pressure side 5 to the low pressure side 6, where it is removed as a permeate 3. FIG. 2 shows details of a typical gas separation membrane comprising a selective layer 7 supported by an asymmetric porous layer 8 and a woven support 9.

The gas separation membrane according to the invention comprises a $CO_2$ selective polymer layer and a support layer. The $CO_2$ selective polymer layer is disposed, e.g. coated, on the support layer. The selective polymer layer comprises carbonic anhydrase (CA) enzymes fixed within the polymer layer and optionally also to a surface of the polymer layer.

The $CO_2$ selective polymer layer may in addition to CA enzymes, comprise amine groups acting as a $CO_2$-philic carriers.

Carbonic anhydrase (CA) is a metalloenzyme generally containing a zinc ion in the active site. It exists in various classes and isoforms and has the fastest known reaction rate with $CO_2$ with a turnover higher than $10^6$ molecules of $CO_2$ per second. $CO_2$ dissolves in water producing a hydrated form according to the following equations

$$CO_2 + H_2O = H_2CO_3; \quad \text{(Eq. 1):}$$

$$H_2CO_3 = HCO_3^- + H^+; \quad \text{(Eq. 2):}$$

$$HCO_3^- = CO_3^{2-} + H+ \quad \text{(Eq. 3):}$$

Among these reactions, the hydration of $CO_2$ (Eq. 1) is the rate-limiting step. The dissociation of bicarbonate to produce carbonate is slow, but faster than hydration of $CO_2$. At pH>10, Eq. 3 dominates the carbonate formation, whereas this step is negligible at pH<8. CA catalyzes the reaction of Eq. 1. By increasing the reaction rate of reaction 1, through the addition of CA, a large amount of $CO_2$ can be fixed as carbonate at a low to moderate pH. This approach has been demonstrated by using carbonic anhydrases of bovine origin. CA isolated from thermophiles, which are bacteria living at temperatures ranging from 50° C. to 110° C., are thermo-stable and stable to the common enzyme denaturants such as $O_2$, and thus, being suitable for example, for flue gas treatment (35 to 50° C.).

The CA enzymes are isolated/produced and reactive side groups of amino acid residues (e.g., amines, hydroxyls, thiols, or phenolic groups), not associated with the active site of the enzyme, will allow subsequent modification and integration/immobilization into a polymer matrix.

Several methods for immobilizing CA enzymes in a polymer layer are possible:

- CA enzymes may be dispersed within the polymer: a known amount of enzymes in an aqueous solution are mixed with a polymer solution consisting of a polymer such as polyvinyl alcohol (PVA), polyacrylamide (PAA, alginate, chitosan or any other suitable polymer and a suitable solvent, and a thin layer of this mixture is applied to the support layer and dried. There will be weak hydrogen bonds between the polymer and the dispersed enzymes.
- CA enzymes may first be chemically modified with e.g. vinyl groups, and then copolymerized together with monomers to form a biopolymer. Thus, the enzymes will be immobilized to the polymer chain in situ during polymerization. Various monomers, such as acrylamide, may be polymerized with CA enzymes.
- An existing polymer may by modified by coupling of CA enzymes to functional groups on the polymer. The polymer may have various functional groups, such as amine groups, in the polymer chain, which can be used to immobilize the enzymes. Thus, the CA enzymes become chemically (covalently) bound to the polymer chain.

Surprisingly, it is shown that the chemically immobilized CA enzymes maintain their activity in the polymer matrix.

The resulting hybrid membrane layer comprising a polymer and fixed carbonic anhydrase enzyme (CA) will combine the durability of a dense polymeric membrane with the selectivity of a supported liquid membrane (SLM), thus eliminating the drawback of SLM-washing out of the carrier over time.

Figure 3:
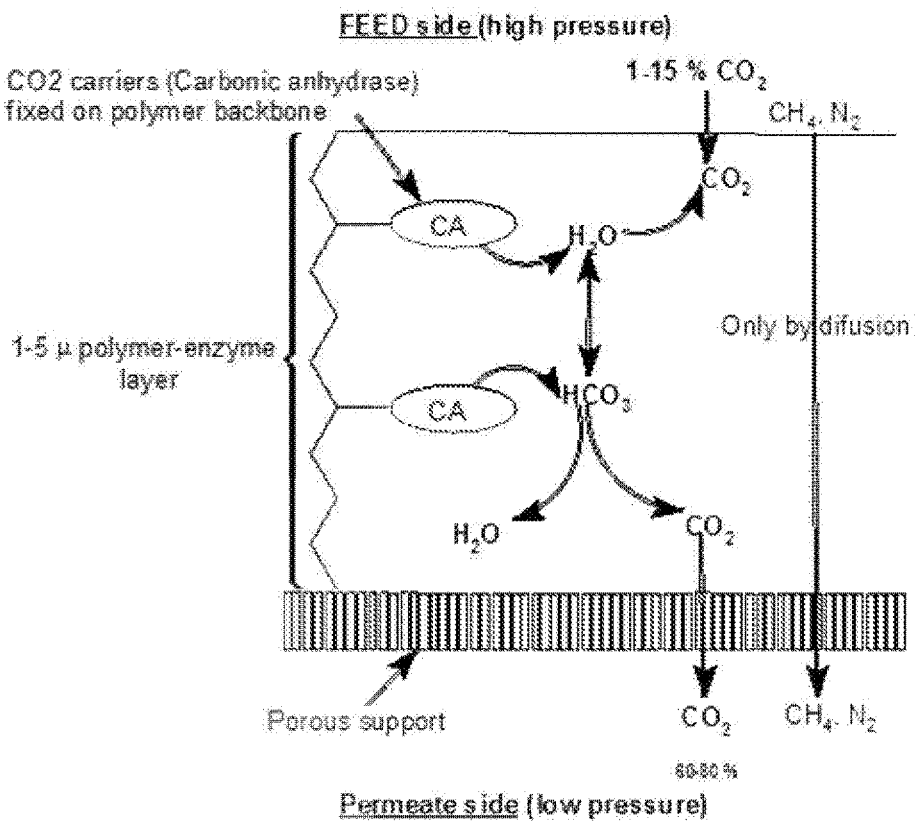
FIG. 3 shows the separation principle of CA enzyme-polymer hybrid membrane according to the present invention.

FIG. 3 illustrates the transport mechanism of the hybrid polymer-enzyme membrane according to the present invention. The membrane comprises a porous support having a polymer-enzyme (CA) layer disposed thereon. The thickness of the polymer-enzyme layer may be in the range from 0.1 to 10 μm, preferably from 1 to 5 μm.

$CO_2$ molecules are transported selectively from the high pressure side (feed side) to low pressure side both by enzyme reaction (facilitated transport) and solution-diffusion. $N_2$ and $CH_4$ molecules, which do not react with CA enzymes, are transported only by solution-diffusion mechanism by dissolving and diffusing in the polymer matrix of the membrane. The reaction equilibrium is shifted towards $CO_2$ transport into the low pressure side (permeate side) and its desorption in the gas phase by continuously removing the permeate using sweep gas or vacuum. The $CO_2$ separation (absorption, reaction with water and enzyme and desorption), takes place in the selective polymer layer. Water in form of water vapours, provided by the target gas itself (flue gas, breathing, etc.), will permeate the thin selective layer and swell the polymer matrix, from feed side to permeate side. In one embodiment, the $CO_2$ concentration of the feed gas may be from 1-15%, and the permeate may then have a $CO_2$ concentration from 60-80%.

Preferably, the $CO_2$ selective polymer is a hydrophilic and/or a water vapour permeable polymer. Examples of suitable hydrophilic polymers are polyvinyl alcohol, chitosan, alginate, polyamide, polyacrylamide and polyvinyl amine.

Examples of suitable water vapour permeable polymers are polydimethylsiloxane (PDMS) and poly[1-(trimethylsilyl)-1-propyne] (PTMSP) and perfluoro polymers such as poly[4,5-difluoro-2,2-bis(trifluoromethyl)-1,3-dioxole-co-tetrafluoroethylene].

Gas separating membranes can typically take two forms, supported or unsupported. The present membrane is carried on a support to provide mechanical strength to the membrane. As noted below, the support can be in the form of a flat sheet or a hollow fibre support. Both these support types may be used in this invention.

Suitable supports giving mechanical strength are known in the art and most are porous. Suitable supports include polyether sulfone (PES), polytetrafluoroethylene (PTFE), polypropylene, sulphonated polysulfone, polyvinylidene fluoride, polyacrylonitrile (PAN) and related block copolymers, cellulose acetate polyimide, polyether imide (PEI), aliphatic polyamides, polyether ether ketone (PEEK), polyphenylene oxide (PPO) and polysulfone (PSF). In a preferred embodiment, the support is PSF. The support can be either flat sheet or hollow fibre support.

Most of these supports have pore size between 0.0001 and 1 μm or expressed more commonly in Daltons and MWCO (Molecular Weight Cut Off): reverse osmosis RO (1-100 Daltons), nanofiltration NF (200-400 Daltons), ultrafiltration UF (1000-200000 Daltons) and microfiltration MF (0.1 to 10 μm).

In some embodiments of the invention, microporous support structures are employed. Such supports have much bigger pores sizes, e.g. from 0.10 to 10 μm making gas transport therethrough very rapid. The pore size of these supports is not generally expressed in MWCO terms and microporous supports are considered to have MWCO values of greater than 100,000.

Microporous supports can be formed from any suitable material including those mentioned above in connection with ultrafiltration membranes and inorganic materials such as ceramics (alumina, zirconium oxide), glass membranes such as silica and the like. These supports can be prepared by sintering, sol gel or leaching techniques known in the art.

The supports providing mechanical strength to the gas separation membrane may as well be a high gas permeable dense support. Examples of suitable materials are: PDMS (polydimethylsiloxane), PTMSP (poly(l-trimethylsilyl-1-propyne), PMP (polymethylpentene) and amorphous fluoroplastics, such as 4,5-difluoro-2,2-bis(trifluoromethyl)-1,3-dioxole-co-tetrafluoroethylene such as AF2400 or AF1600 (Teflon).

The gas separation membrane may further comprise a protective layer made of high gas and water vapour permeability material coated on top of the $CO_2$ selective polymer layer.

Figure 4:
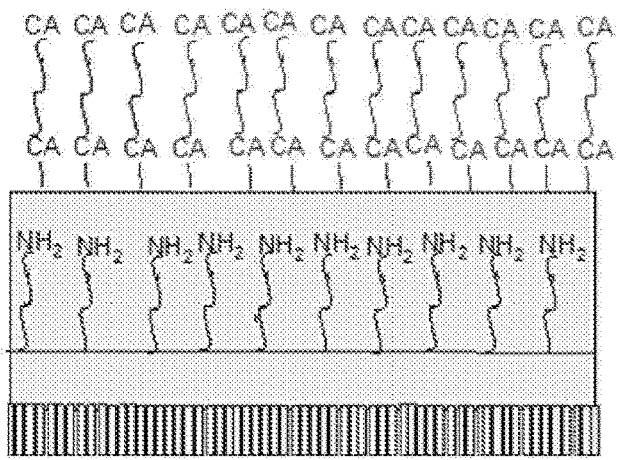
FIG. 4 shows a schematic view of a hybrid membrane with a multilayer structure one layer modified with CA-enzymes and one layer containing $NH_2$ groups.
Figure 5:
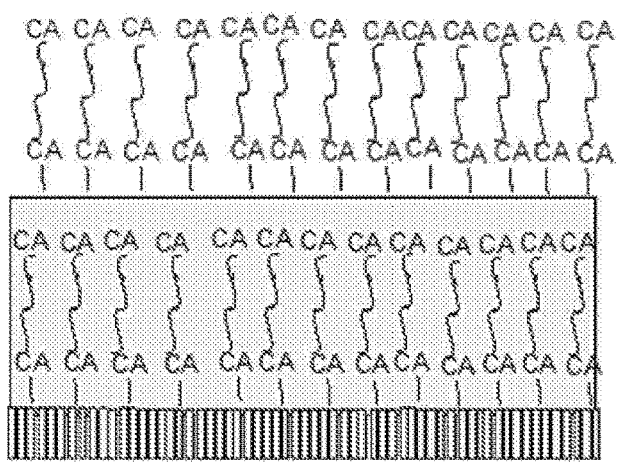
FIG. 5 shows a schematic view of a hybrid membrane with multilayer structure two layers of CA-enzyme modified polymer.

The $CO_2$ selective polymer layer may have a multilayer structure formed by at least two layers of CA enzyme modified polymer layers, see FIG. 4. Alternatively, the layers may be selected from CA-enzyme—and amine—containing polymer layers; see FIG. 5.

The gas separation membrane according to the invention enables a one-step gas separation process. There is only one phase (gas-gas), and no liquid present for absorption. This result in reduced complexity, reduced amount of enzyme, reduced size and weight of installation, and easy scalability compared with gas separation systems using enzymes such as Liquid Membranes (SLM) and membrane contactors (MC).

The gas separation membrane according to the invention is to be used for separation of $CO_2$ from a gas mixture. Examples of gas mixtures are flue gas, natural gas, biogas, $CO_2$ and $H_2$; fermentation gases and anaesthetic gases. The membranes are especially useful for separating $CO_2$ from blood, or from water in aquaculture and pisciculture and other industrial applications which needs water or a liquid degassing.

Especially preferred are gas mixtures containing a low concentration of $CO_2$, such as mixtures with less than 5% by volume of $CO_2$.

In a method of separating $CO_2$ from a gas mixture, the gas mixture is being supplied along a feed side of a gas separation membrane according to the invention. At least part of the gas mixture will diffuse through the membrane due to an applied partial pressure difference, i.e. high pressure at the feed side and low pressure (atmospheric) on the permeate side. $CO_2$ molecules will be selectively transported from the feed side to a permeate side by enzyme reaction (facilitated transport) and solution-diffusion. $CO_2$ molecules will be continuously removed from the permeate side to maintain the partial pressure difference.

Applications of the gas separation membrane of the present invention include separation of $CO_2$ from gas mixtures including $CO_2$ with various components such as nitrogen, methane, carbon monoxide (CO), oxygen, volatile organic compounds or hydrogen. Separation of mixtures involving hydrogen is also envisaged. These gases can occur in any circumstance such as in industrial and domestic gas streams. In use, the gas mixture to be separated will typically flow across the membrane under pressure. The temperatures employed may vary, typically temperatures are in the range of 0 to 90° C., preferably at 20 to 65° C.

Preferably, the membrane is used to separate carbon dioxide from nitrogen and/or methane. In this latter regard, the membranes of the invention may therefore have applications in the field where these gases are present in mixtures such as flue gas, natural gas, biogas, air, fermentation processes and anaesthetic gases.

The gas separation membrane of the present invention is especially useful at low concentrations of $CO_2$, i.e. less than 40%. In aquaculture $CO_2$ dissolved in water (60 ppm), from 400 ppm in clean air, 1% various industries such as aluminium industry, 4-5% breath, flue gas 3.5% to 15% depending on the fuel burned and biogas and natural gas which can contain from 10% to 40% $CO_2$.

EXPERIMENTS

Carbonic Anhydrase Production and Purification

The carbonic anhydrase enzymes used in the experiments were produced recombinantly in *Escherichia coli* and most of the host proteins were then removed by heat precipitation at 65° C., followed by centrifugation as described in patent application WO2014/090327 A1. The strain used in the following examples was SCA 11 as referred in WO2014/090327 A1, but any other strain or other CA can be used.

Preparation of Flat Sheet Membranes

Composite membranes consisting of support, dense or porous, and a dense $CO_2$ separation layer were prepared by solution casting of the separation layer onto the support followed by drying at room temperature or at elevated temperature in an oven.

The porous supports used were either commercially available ultrafiltration polysulfone (PSF) 50 000 MWCO or fluoro membranes (PVDF) 10 000 MWCO.

The dense supports were prepared onto a Teflon dish by solution casting of PTMSP, PDMS in hexane or cyclohexane solvent and AF 2400 in FC-72 solvent followed by drying at room temperature or elevated temperature in an oven. Some commercial microporous (0.2 microns) PVDF membranes were also used as separate mechanical support underneath these membranes during gas permeation testing.

The dense $CO_2$ separation layer on top of the support was made of polyvinyl alcohol (PVA) or polydimethylsiloxane (PDMS) or polyacrylamide (PAA) containing CA enzymes introduced/fixed according to different methods described below:

Method 1: Chemical Coupling of CA Enzymes to $CO_2$ Separation Layer

CA enzymes were coupled to PVA membrane coated on a support by using a bifunctional linker (glutaraldehyde). One functional group reacts with hydroxyl groups and the second functional group reacts with residual amino groups of CA enzymes.

A sequential approach was used to reduce undesired side reactions:
1. The PVA membrane was prepared by coating on porous support.
2. The PVA membrane was activated with a glutaraldehyde solution 10 mL 0.5 mmol/mL.
3. The glutaraldehyde solution was removed and 10 mg enzyme was added in buffer solution pH=7.4.
4. The multilayer membranes were prepared as following: The excess enzymes were removed, a new glutaraldehyde solution 10 mL, 0.5 mmol/mL was added for the activation followed by enzyme buffer solution addition.

Method 2: CA Enzyme Dispersed in Polymer Matrix of Separation Layer (PVA)

The CA enzymes become weakly bound to the polymer chains by hydrogen bonds when dispersed in polymer matrix. 2% aqueous solution of PVA was mixed with an enzyme solution. The concentration of CA enzymes was 52.9 mg/g PVA. The blend was coated on PSF 50000 MWCO support.

Method 3: Copolymerisation of Chemically Modified CA Enzymes and Acryl Based Monomers CA enzymes were modified with vinyl groups and copolymerized with acrylamide in a buffer solution pH 7.4. Two different ratios of CA enzymes/Aam (acrylamide) were used; 40 mg CA enzymes/g Aam and 100 mg CA enzymes/g Aam. To introduce vinyl groups, the CA enzymes were treated with N-hydroxy succinimide acrylate (NSA). Two molar ratios NSA/CA enzymes were used; 8.89 and respective 5.56 (less vinyl groups). The resulting polymer solution was coated on porous and dense supports. Three different biopolymers were obtained: CA enzyme-PAA 0: NSA/CA enzyme ratio 8.89 and 40 mg CA/g Aam; CA enzyme-PAA 1: NSA/CA enzyme ratio 5.56 and 40 mg CA/g Aam, and CA enzyme-PAA 2: NSA/CA enzyme ratio 5.56 and 100 mg CA/g Aam.

When a dense support was used, it consisted of self-standing membranes of PTMSP, PDMS and AF2400 and following methods were also used:

Method 4: UV Grafting with Glycidyl Methacrylate (GMA) on Dense Support Followed by CA Enzyme Coupling.

The membrane surface was modified by UV grafting using a sequential approach. The sequential approach has the advantage that it reduces undesired side reactions.
1. To create the grafting points where the monomer grafting will start, the membrane was soaked in an initiator (benzophenone) 1% solution in methanol and exposed to UV radiation.
2. The initiator solution was removed and the membrane was washed gently with methanol.

3. The membrane was then soaked in 10% monomer solution (glycidyl methacrylate (GMA) solution) and exposed to UV radiation to promote the polymerization.
4. The monomer solution was then removed and the membrane was washed several times with water to remove the unreacted monomer as well as the polymer unbound to the membrane surface.
5. The enzymes were coupled with the polyglycidyl methacrylate via epoxy groups.

Method 5: UV Grafting with AEMA Followed by Coating of the Biopolymer Solution Obtained According to Method 3

The membranes were prepared using the sequential described at Method 4 using aminoethyl methacrylate (AEMA) instead of GMA monomer. The grafted membranes were then coated with the biopolymer solution prepared by the Method 3.

Method 6: UV Grafting with AEMA Followed by Coupling of CA Enzymes by Activation with Glutaraldehyde.

The membranes were prepared using the sequential described at Method 4 using AEMA monomer instead of GMA monomer.

The grafted membranes were then coupled with CA enzymes using glutaraldehyde (GA) as linker.

Mixed Gas Permeation Testing

Gas separation properties such as $CO_2$ permeance or $CO_2$ permeability (permeance/membrane thickness) and $CO_2/N_2$ selectivity (ratio of $CO_2$ and $N_2$ permeances) were measured for the prepared membranes by using gas mixtures of $CO_2$ and $N_2$ fully humidified, similar to real gas compositions: flue gas (5 to 15% $CO_2$), breathing (5% $CO_2$) etc. The experiments were conducted at 25° C. and feed pressure was between 1.2 bar and 5 bar absolute pressure. A sweep gas, helium, was used in the permeate side of the membrane as mean of creating a driving force. The feed gas had 5% or 15% $CO_2$ content. The permeate flow and its composition was measured continuously by flow meter and a gas chromatograph and used to calculate $CO_2$ permeance and $CO_2/N_2$ selectivity.

Results

Example 1

PVA on 50 000 MWCO PSF support modified with glutaraldehyde and CA enzymes (600 µl of 17.6 mg/ml CA enzyme solution) according to Method 1.

The effect of CA enzyme addition to membrane performances at 1.2 bar, 25° C., and 15% $CO_2$ in $N_2$ humidified feed gas is shown in Table 1.

TABLE 1

| Membrane/modification | $CO_2$ permeance ($m^3$ (STP)/($m^2$ bar h)) | $CO_2/N_2$ selectivity |
|---|---|---|
| PVA/PSF reference | 0.20 | 41 |
| PVA/PSF + glutaraldehyde + CA enzymes | 0.06 | 57 |
| PVA/PSF 2 + glutaraldehyde + CA enzymes | 0.11 | 54 |

Example 2

CA enzymes were dispersed in PVA polymer solution and supported on 50 000 MWCO PSF according to Method 2. The resulting membranes were tested with 15% $CO_2$ in $N_2$ fully humidified at 25° C.

The effect of CA enzymes dispersed in PVA on membrane performance at 1.2 bar, 25° C., and 15% $CO_2$ in $N_2$ humidified feed gas is shown in Table 2.

TABLE 2

| Membrane/modification | $CO_2$ permeance ($m^3$ (STP)/($m^2$ bar h)) | $CO_2/N_2$ selectivity |
|---|---|---|
| PVA/PSF reference | 0.20 | 41 |
| PVA + CA enzyme dispersed/PSF | 0.13 | 58 |

Figure 6:
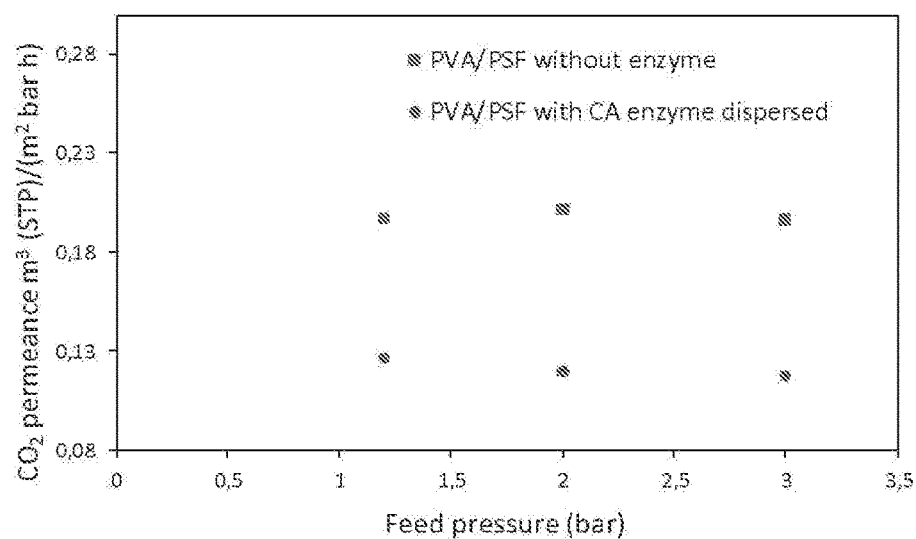
FIG. 6 shows the $CO_2$ permeance as a function of feed pressure, using hybrid membranes PVA/PSF and PVA/PSF modified with CA enzymes.
Figure 7:
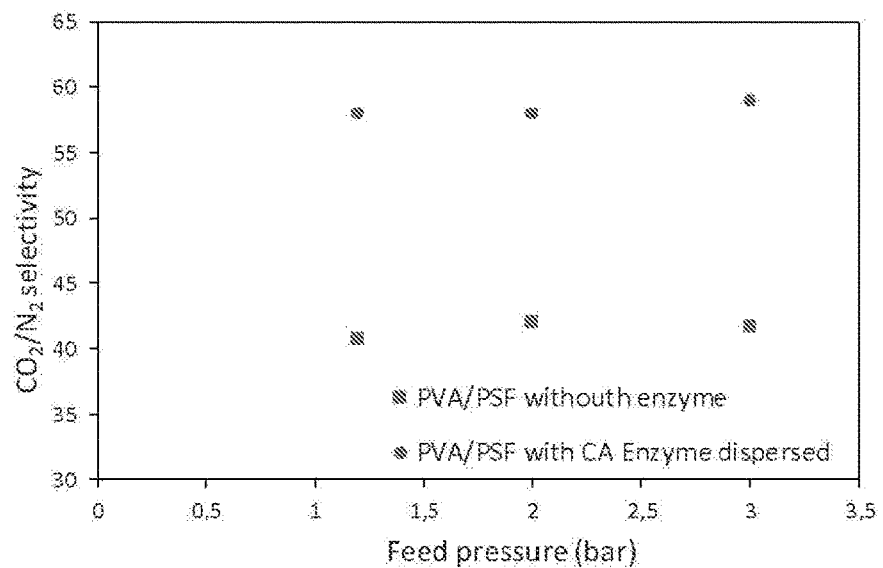
FIG. 7 shows the $CO_2/N_2$ selectivity as a function of feed pressure, using hybrid membranes PVA/PSF and PVA/PSF modified with CA enzymes.

The $CO_2$ permeance and $CO_2/N_2$ selectivity variation with increasing pressure for PVA/PSF and PVA/PSF modified with CA enzymes are shown in the plot diagrams of FIGS. 6 and 7. The plot diagram (FIG. 6) shows that the $CO_2$ permeance decreases for the PVA/PSF with CA enzymes. The plot diagram (FIG. 7) shows that $CO_2/N_2$ selectivity increases for the PVA/PSF with CA enzymes. Increasing feed pressure, the results are relatively constant for $CO_2/N_2$ selectivity and slightly decreasing for $CO_2$ permeance.

Example 3

Copolymerisation of chemically modified CA enzymes and acryl based monomer according to Method 3.

Figure 8:
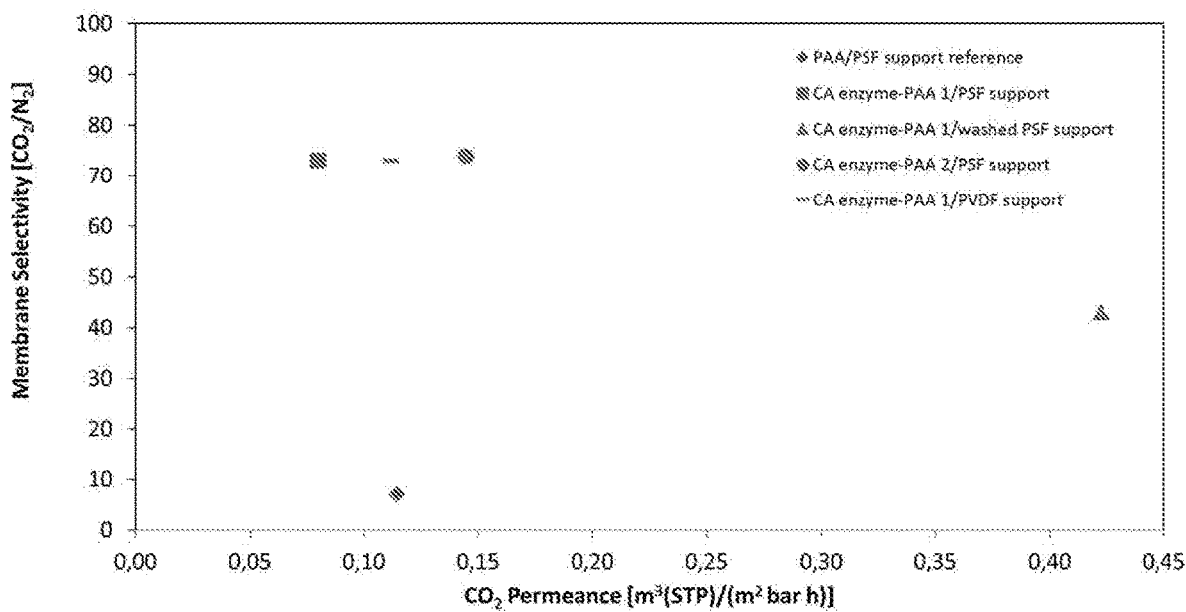
FIG. 8 shows the $CO_2/N_2$ selectivity as a function of $CO_2$ permeance using hybrid membranes CA-PAA biopolymer on porous supports PSF and PVDF

The results obtained using CA enzyme-PAA biopolymer on various porous supports at 1.2 bar, 25° C., and using 5% $CO_2$ in $N_2$ humidified feed gas are shown in Table 3 and FIG. 8.

TABLE 3

| Membrane/modification | $CO_2$ permeance ($m^3$ (STP)/($m^2$ bar h)) | $CO_2/N_2$ selectivity |
|---|---|---|
| PAA/PSF reference | 0.11 | 7 |
| CA enzyme-PAA 1/PSF support | 0.08 | 73 |
| CA enzyme-PAA 2/PSF support | 0.14 | 74 |
| CA enzyme-PAA 1/PVDF support | 0.11 | 73 |
| CA enzyme-PAA1/washed PSF support | 0.42 | 43 |

All the membranes prepared using CA enzymes-PAA 1 and CA enzymes-PAA 2, both on porous and dense supports showed a substantial increase in $CO_2/N_2$ selectivity compared with references.

FIG. 8 shows a plot diagram summarizing the results obtained using the membranes on porous supports, PSF and PVDF. The membranes according to present invention have increased $CO_2/N_2$ selectivity 6 to 11-fold compared with the reference. The CA enzymes-PAA 2 membrane also showed higher $CO_2$ permeance than the reference membrane.

Figure 9:
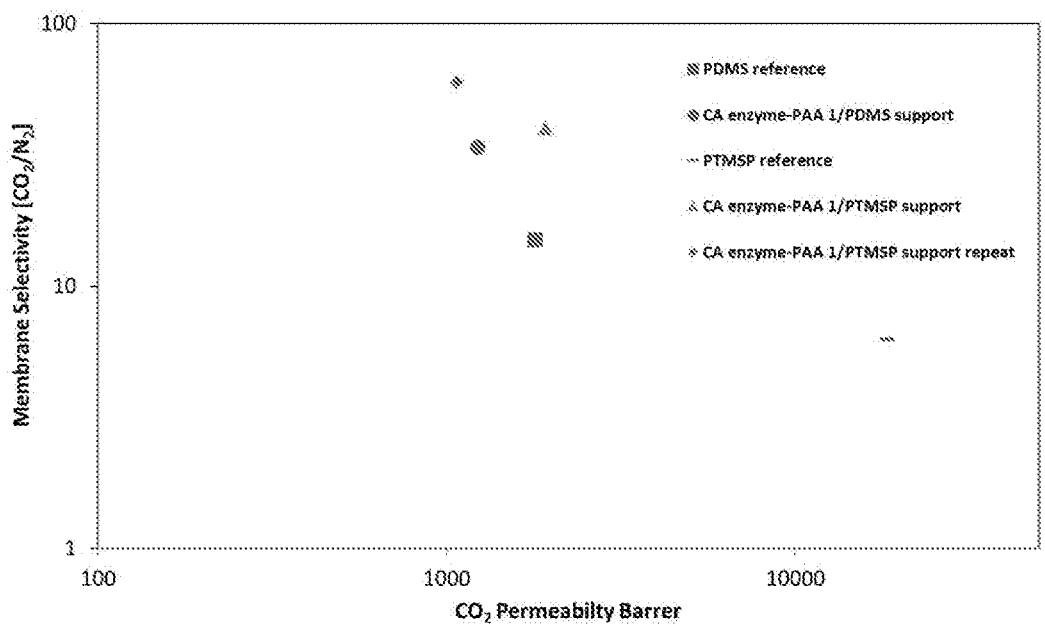
FIG. 9 shows the $CO_2/N_2$ selectivity as a function of $CO_2$ permeance using hybrid membranes CA-PAA biopolymer on dense supports PTMSP and PDMS

FIG. 9 shows a plot diagram summarizing the results of the CA-PAA biopolymer membranes on dense supports, PTMSP and PDMS at 1.2 bar, 25° C., and using 5% $CO_2$ in $N_2$ humidified feed gas. Similar to porous supports a substantial increase of $CO_2/N_2$ selectivity is observed due to the presence of CA enzymes. The additional layer of CA-PAA biopolymer decreases the $CO_2$ permeability compared to reference membranes, but still presenting high $CO_2$ permeabilities values, i.e. above 1000 Barrer.

The results obtained using CA enzyme-PAA biopolymer on dense supports at 1.2 bar, 25° C., and using 5% $CO_2$ in $N_2$ humidified feed gas are shown in Table 4 for PTMSP supports and in Table 5 for PDMS supports.

TABLE 4

| Membrane/modification | $CO_2$ permeability (Barrer) | $CO_2/N_2$ selectivity |
|---|---|---|
| PTMSP reference | 18250 | 6 |
| CA enzyme-PAA 1/PTMSP | 1070 | 60 |
| CA enzyme-PAA 2/PTMSP repeat | 1917 | 40 |

TABLE 5

| Membrane/modification | $CO_2$ permeability (Barrer) | $CO_2/N_2$ selectivity |
|---|---|---|
| PDMS reference | 1788 | 15 |
| CA enzyme-PAA 1/PDMS | 1223 | 34 |

Example 4 UV Grafting with AEMA) Followed by Coating of the Biopolymer (PAA-CA Enzyme) Solution According to Method 5

Membrane $CO_2$ permeability and $CO_2/N_2$ selectivity at 1.2 bar, 25° C., 5% $CO_2$ in $N_2$ fully humidified is shown in Table 6:

TABLE 6

| Membrane/modification | $CO_2$ permeability (Barrer) | $CO_2/N_2$ selectivity |
|---|---|---|
| PTMSP reference | 18250 | 6 |
| PTMSP UV grafted with AEMA | 13650 | 11 |
| CA enzyme-PAA 1/PTMSP grafted with AEMA | 91 | 42 |
| CA enzyme-PAA 2/PTMSP grafted with AEMA | 183 | 24 |

The CA enzyme-PAA 2 membrane has 2.5 times less CA enzymes per milligram of polyacrylamide (PAA) compared to the CA enzyme-PAA1 membrane.

For the UV grafting procedure 10% in water aminoethyl methacrylate (AEMA) was used.

The results are expressed in permeability (Barrer) instead permeance ($m^3$ (STP)/(bar $m^2$ h) in order to compensate for the variation of the relatively thick dense support (25 to 50 microns). For conversion reasons 1000 Barrer represent a permeance of 2.7 $m^3$ (STP)/(bar $m^2$ h) for 1 μm thick membrane.

The results show a big decrease of $CO_2$ permeability, but show 4 and respectively 7 times $CO_2/N_2$ selectivity increase compared to PTMSP due to the introduction of CA enzymes.

Example 5: UV Grafting with AEMA Followed by Coupling of CA Enzymes by Activation with Glutaraldehyde According to Method 6

Membrane $CO_2$ permeability and $CO_2/N_2$ selectivity at 1.2 bar, 25° C., 5% $CO_2$ in $N_2$ fully humidified are shown in Table 7.

TABLE 7

| Membrane/modification | $CO_2$ permeability (Barrer) | $CO_2/N_2$ selectivity |
|---|---|---|
| PTMSP reference | 18250 | 6 |
| PTMPS UV grafted med AEMA | 13650 | 11 |
| Glutaraldehyde + CA enzymes/ PTMSP UV grafted with AEMA | 210 | 25 |

For the UV grafting procedure 10% in water aminoethyl methacrylate (AEMA) was used.

The results are expressed on permeability (Barrer) instead of permeance ($m^3$ (STP)/(bar $m^2$ h) in order to compensate for the variation of the relatively thick dense support (25 to 50 microns). For conversion reasons 1000 Barrer represent a permeance of 2.7 $m^3$ (STP)/(bar $m^2$ h) for 1 μm thick membrane.

The results show a big decrease on $CO_2$ permeability, but show 4 times increase of $CO_2/N_2$ selectivity compared to PTMSP due to the introduction of CA enzymes.

Test of Membrane Durability

One membrane, PAA-CA Enzyme 1/PTMSP prepared according to procedure in Method 3 was selected and the membrane exposed for over 350 hours to the following test conditions: 5% $CO_2$, 85% $N_2$, 10% $O_2$, 300 ppm $SO_2$; 1.2 bar pressure, 25° C., and humid gases. The composition is very typical for flue gases from power plants. Both $CO_2$ flux (permeance) and $CO_2/N_2$ selectivity remained relatively constant in time showing the potential applicability for $CO_2$ capture from flue gases.

Figure 10:
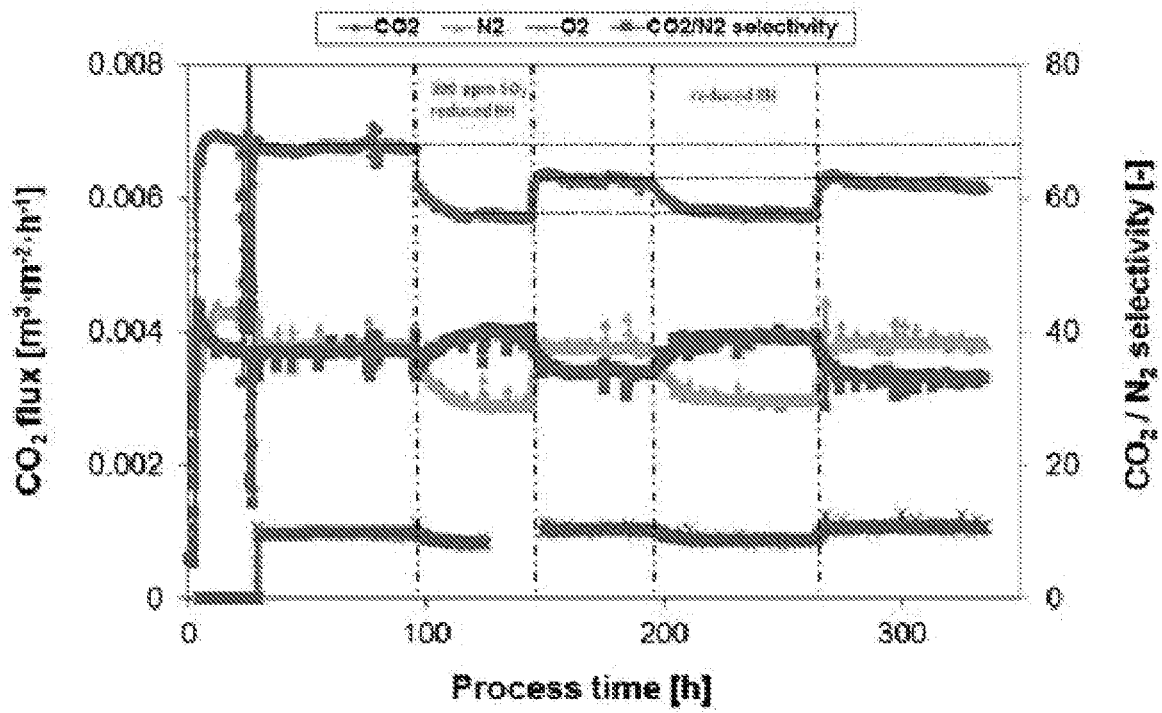
FIG. 10 shows durability in time of hybrid membranes when exposed to a typical flue gas.

The results are presented in FIG. 10.

The invention claimed is:

1. A gas separation membrane comprising:
   a dense gas permeable support layer or porous support layer; and
   at least one $CO_2$ selective polymer layer comprising carbonic anhydrase (CA) enzymes fixed within the at least one $CO_2$ selective polymer layer, wherein the at least one $CO_2$ selective polymer layer is a biopolymer layer formed by copolymerisation of chemically modified CA enzymes and monomers; and wherein the at least one $CO_2$ selective polymer layer is based on a hydrophilic polymer.

2. The gas separation membrane according to claim 1, where the at least one $CO_2$ selective polymer layer further comprises amine groups.

3. The gas separation membrane according to claim 1, wherein the CA enzymes are thermostable enzymes resistant to temperature of at least 50° C.

4. The gas separation membrane according to claim 1, wherein the hydrophilic polymer is selected from polyvinyl alcohol, polyacrylamide, polyvinyl amide, alginate, chitosan and polyvinyl amine.

5. The gas separation membrane according to claim 1, further comprising a protective layer made of high gas and water vapour permeability material coated on top of the CO2 selective polymer layer.

6. The gas separation membrane according to claim 1, wherein the at least one $CO_2$ selective polymer layer has a thickness in the range from 0.1 to 10 μm.

7. The gas separation membrane according to claim 1, wherein the at least one $CO_2$ selective polymer layer has multilayer structure formed by at least two layers of the CA enzyme modified polymer layers.

8. The gas separation membrane according to claim 6, wherein the $CO_2$ selective polymer layer has a thickness in the range from 0.1 to 5 μm.

9. The gas separation membrane according to claim 1, wherein the at least one $CO_2$ selective polymer layer has multilayer structure formed by at least a CA enzyme modified polymer layer and an amine-containing polymer layer.

* * * * *